(12) United States Patent
Rasmussen

(10) Patent No.: US 11,333,186 B2
(45) Date of Patent: May 17, 2022

(54) DOWEL PIN FOR EASY ASSEMBLY AND HIGH ACCURACY

(71) Applicant: Component 2.0 A/S, Hørsholm (DK)

(72) Inventor: Janus Juul Rasmussen, Helsinge (DK)

(73) Assignee: Component 2.0 A/S, Hørsholm (DK)

( * ) Notice: Subject to any disclaimer, the term of this patent is extended or adjusted under 35 U.S.C. 154(b) by 0 days.

(21) Appl. No.: 17/440,481

(22) PCT Filed: Mar. 12, 2020

(86) PCT No.: PCT/DK2020/050061
§ 371 (c)(1),
(2) Date: Sep. 17, 2021

(87) PCT Pub. No.: WO2020/192853
PCT Pub. Date: Oct. 1, 2020

(65) Prior Publication Data
US 2022/0090617 A1    Mar. 24, 2022

(30) Foreign Application Priority Data

Mar. 27, 2019  (DK) .............................. PA201970187
Mar. 27, 2019  (DK) .............................. PA201970188

(51) Int. Cl.
  *F16B 13/12*  (2006.01)
  *F16B 19/00*  (2006.01)
  *F16B 5/06*  (2006.01)

(52) U.S. Cl.
  CPC .......... *F16B 13/126* (2013.01); *F16B 5/0642* (2013.01); *F16B 19/004* (2013.01); *F16B 13/12* (2013.01)

(58) Field of Classification Search
  CPC ........ F16B 5/0642; F16B 13/00; F16B 13/12; F16B 13/126; F16B 19/00; F16B 19/004; F16B 19/02; F16B 21/06; F16B 21/086
  (Continued)

(56) References Cited

U.S. PATENT DOCUMENTS

| 2,100,873 A | * | 11/1937 | Roberts | ................... F16B 19/02 |
| | | | | 411/58 |
| 3,461,772 A | * | 8/1969 | Barry | ................... F16B 13/126 |
| | | | | 411/80.1 |

(Continued)

FOREIGN PATENT DOCUMENTS

| CN | 202348887 | 7/2012 |
| DE | 4231339 | 3/1994 |

(Continued)

OTHER PUBLICATIONS

Written Opinion of the International Searching Authority dated May 25, 2020 from IA PCT/DK2020/050061.

(Continued)

*Primary Examiner* — Roberta S Delisle
(74) *Attorney, Agent, or Firm* — Crockett & Crockett, PC; K. David Crockett, Esq.; Niky Economy Syrengelas, Esq.

(57) ABSTRACT

A dowel pin (1) according to a first aspect with a cylindrical body (4). The cylindrical body (4) is divided into first and second parts (2,3). The first part (2) is movably connected to the second part (3) allowing only relative transverse movement between the first and second parts (2,3). According to a second aspect, the dowel pin (1) comprises a cylindrical circumferential surface (5) and first and second longitudinal ends. The circumferential surface (5) comprises a first plurality of primary radially lifted contact areas (33) at a first distance D1 from the first longitudinal end and a second distance D2 from the second longitudinal end, with D1 being less than D2, and a second plurality of secondary lifted contact areas (35,36) at a third distance D3 from the first longitudinal end and a fourth distance D4 from the second longitudinal end, D3 being larger than D4.

25 Claims, 5 Drawing Sheets

(58) Field of Classification Search
USPC .................................................. 411/500, 511
See application file for complete search history.

(56) References Cited

U.S. PATENT DOCUMENTS

| | | | | | |
|---|---|---|---|---|---|
| 3,550,244 | A | * | 12/1970 | Utzy | ..................... F16B 1/0071 29/407.05 |
| 3,606,410 | A | | 9/1971 | Inserra | |
| 4,553,334 | A | | 11/1985 | Fell | |
| 4,647,883 | A | * | 3/1987 | Oxley | ..................... F16B 19/02 333/232 |
| 5,568,675 | A | * | 10/1996 | Asami | ................. F16B 19/1081 24/297 |
| 6,345,946 | B1 | * | 2/2002 | Mainini | .................. F16B 5/065 411/339 |
| 7,794,273 | B2 | * | 9/2010 | Xu | ....................... H01R 13/621 439/555 |
| 2004/0020016 | A1 | * | 2/2004 | Yoneoka | ............. F16B 19/1081 24/297 |
| 2006/0088396 | A1 | * | 4/2006 | Thom | ................... F16B 1/0071 411/80.1 |
| 2009/0274533 | A1 | * | 11/2009 | Zimmer | ................ F16B 13/126 411/49 |
| 2018/0156255 | A1 | * | 6/2018 | Kowalenko | ........... F16B 37/127 |
| 2021/0033132 | A1 | * | 2/2021 | Sin Yan Too | ....... H01L 23/4093 |

FOREIGN PATENT DOCUMENTS

| | | |
|---|---|---|
| EP | 0662200 | 7/1995 |
| EP | 1529966 | 5/2005 |
| EP | 1548297 | 6/2005 |
| ES | 2273210 | 5/2007 |
| GB | 1237714 | 6/1971 |
| NZ | 244817 | 11/1997 |

OTHER PUBLICATIONS

International Search Report dated May 19, 2020 from IA PCT/DK2020/050061.

* cited by examiner

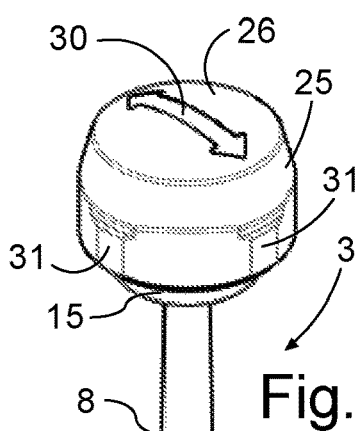
Fig. 1
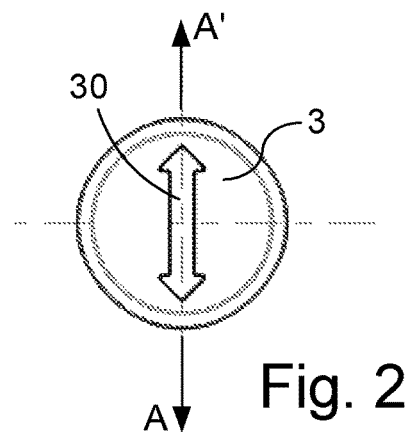
Fig. 2
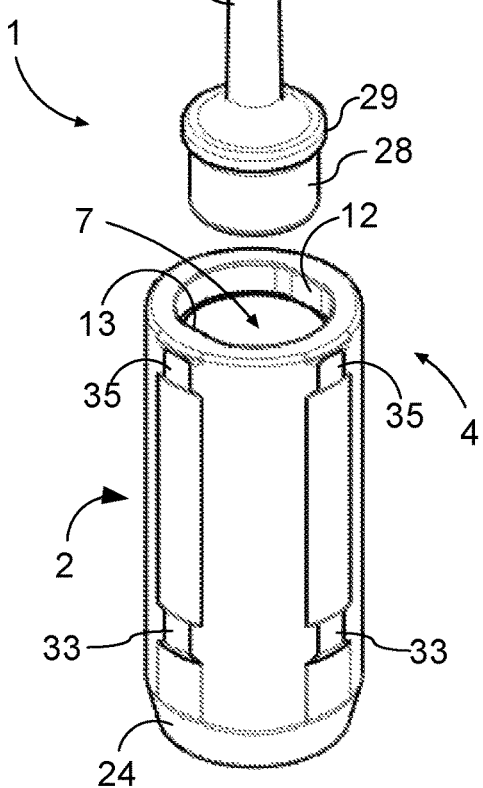
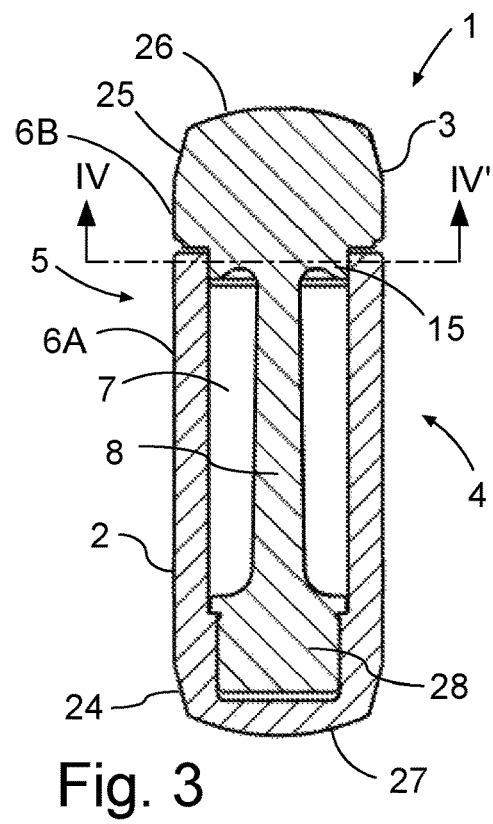
Fig. 3
Fig. 5
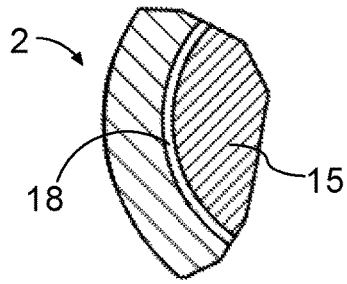
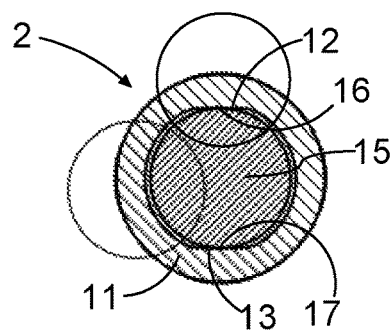
Fig. 4
Fig. 6
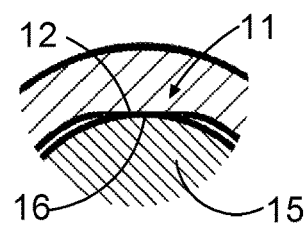

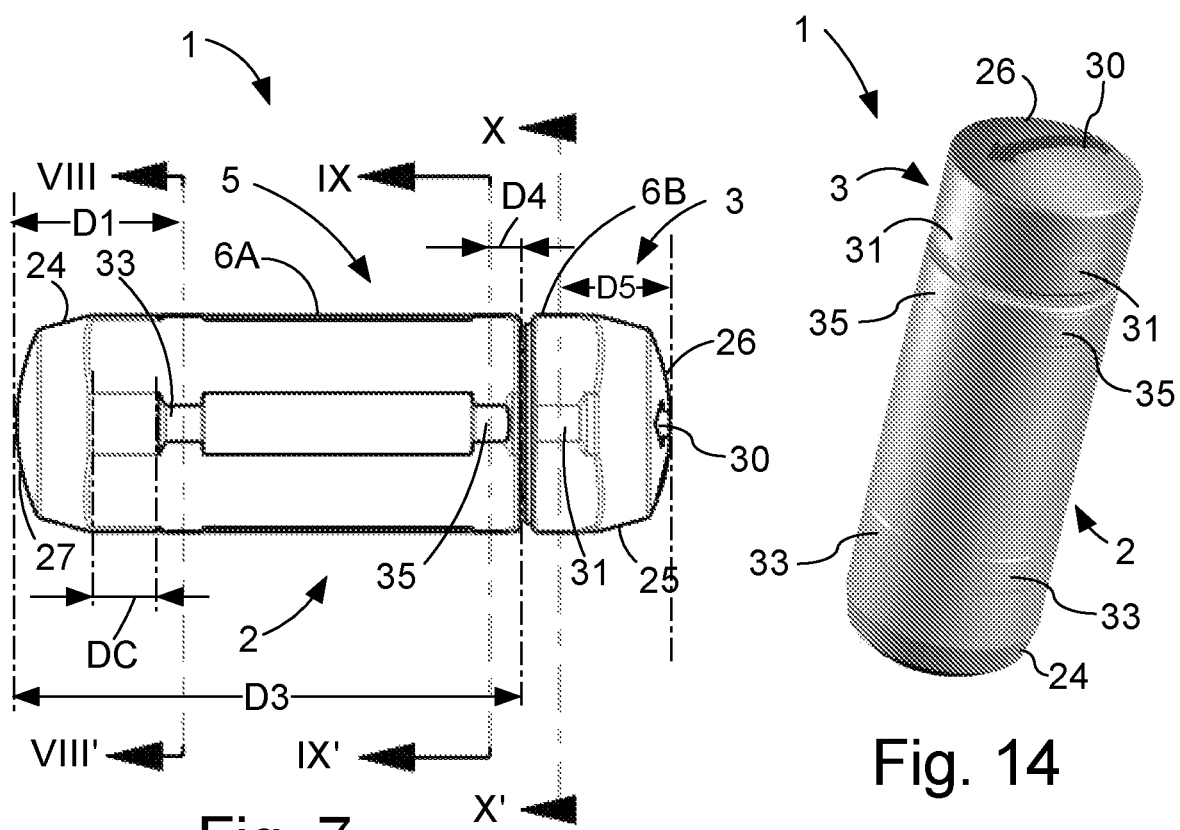
Fig. 7
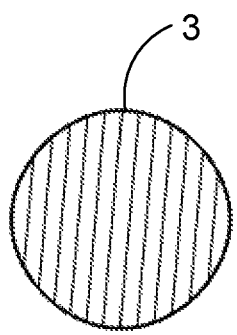
Fig. 14
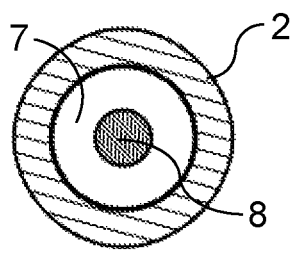
Fig. 8
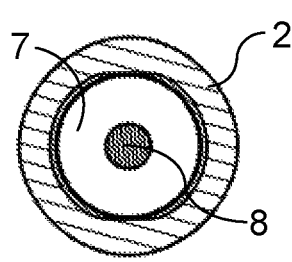
Fig. 9
Fig. 10

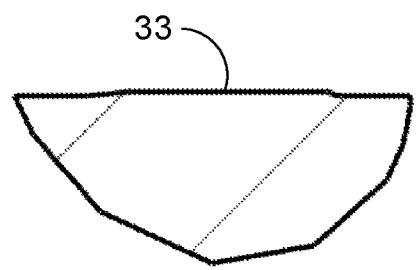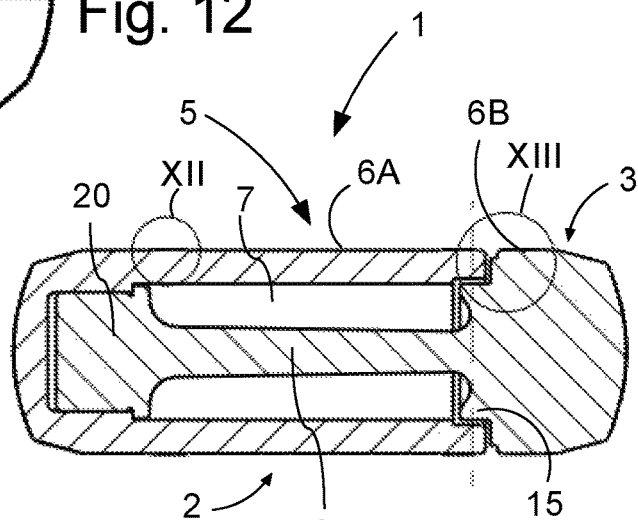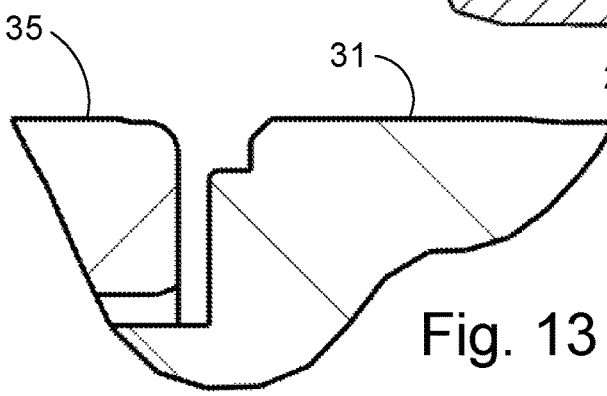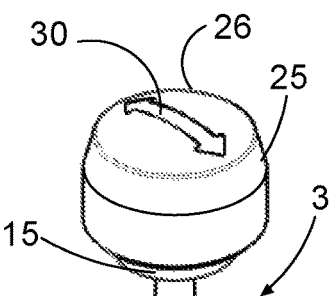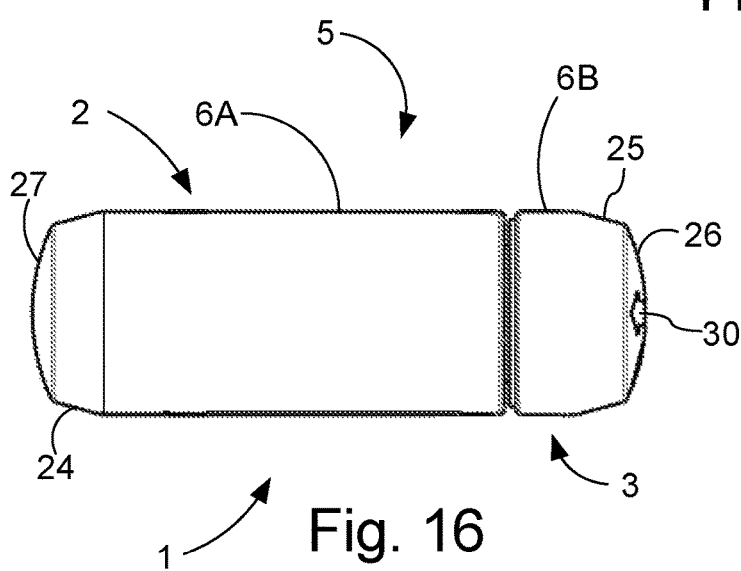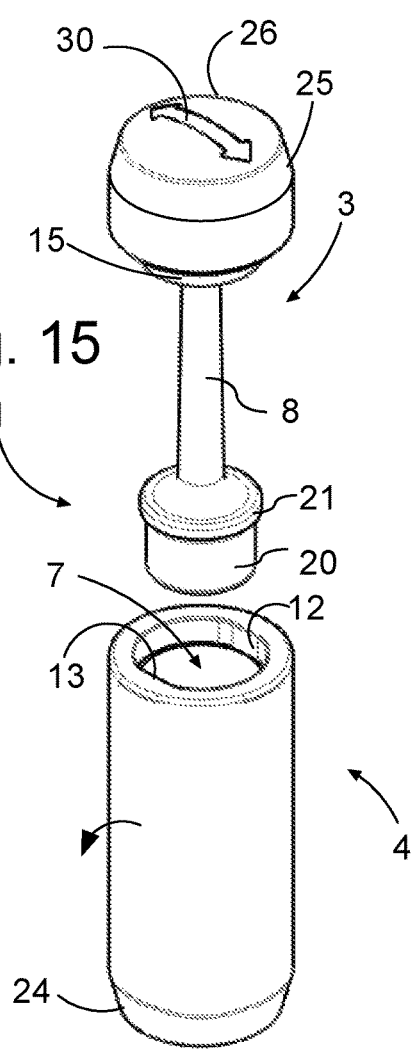

DOWEL PIN FOR EASY ASSEMBLY AND HIGH ACCURACY

TECHNICAL FIELD

The disclosure relates to a cylindrical pin, such as e.g. a dowel pin or parallel pin for connecting and/or guiding components, particularly in tooling, fixture and machine construction, which has a cylindrical circumferential surface. Such cylindrical pins are above all used for arresting or pinning plates, individual elements, or tool portions for cutting, stamping, or shaping tools. The dimensions of the cylindrical pins are regulated by standards, particularly DIN 6325 or ISO 8734.

BACKGROUND

Dowel pins are typically used to secure correct accurate and precise positioning of a part or component in three directions relative to a substrate. When designing mechanical components, mechanical engineers typically use dowel holes as reference points to control positioning variations and attain repeatable assembly quality.

There are a variety of specifications, military, ISO, DIN, ASME that dowel pins may be made to. In DIN 6325 standard the dowel pins are slightly larger than the nominal value. For example, a 3 mm dowel pin will range from 3.002 to 3.008. In the ISO 2338 standard, the dowel pins are slightly smaller—3 mm nominal range is 2.986 to 3.000. The terminology (e.g. "oversized", "standard") is not entirely consistent across suppliers.

Both dowel pins and the holes for the dowel pins are machined (reamed) with a tight tolerance.

The fit between the hole and the pin can be a press fit, i.e. the hole has a slightly smaller diameter than the dowel, said during assembly the dowel pin must be pressed with force into the hole. Alternatively, the fit can be a slip fit, i.e. the whole has a layer matter slightly larger than the dowel pin. The dowel pin slips into the hole and slides out easily.

Precision location can be very important in various engineering applications, such as e.g. machining and assembly. In machining, the tool follows a very precise path and a workpiece must be located precisely and stably at a precise position. In assembly, the positions of assembled parts must be assembled easily and overconstraint of the parts must be avoided.

In manufacturing, challenge for the engineers is the balance between precision and ease of assembly when a component to be machined or treated another form needs to be positioned on the machine that will carry out the operation.

Accurate positioning of such an object is often crucial in order to avoid the component to be rejected after machining.

Typically, a pair of two dowel pins is used to locate the component on the substrate.

For easy assembly, clearance between the dowel pin and the hole in which it is received is needed and for high accuracy clearance between the dial pin and the hole in which it is received should be eliminated.

This dilemma forces industry to demand for very high precision manufacturing and accept mounting difficulties in the production.

U.S. Pat. No. 4,553,334 discloses a universal dowel pin system 10 for properly aligning any one of a plurality of workpiece fixtures 12 relative to a machine tool table 14 comprises a dowel pin 20 which has a square-shaped base section 22 adapted to be dimensionally customized so that the width dimension thereof is substantially the same as the width dimension of the space defined between the sidewalls 18 of the machine tool table T-slot 16, while the upper pin section 24 of the dowel pin 20 has a diametrical dimension which is substantially the same as the uniform or standardized diametrical dimension of a bore 30 which may be defined within an insert 28 or directly defined within the particular workpiece fixture 12. In this manner, as all of the different workpiece fixtures, 12 all have the same standardized bore 30, and the pin section 24 of each dowel pin 20 has the same dimensional value for mating with the standardized bore 30, once a particular machine tool table 14 is provided with its particular dowel pin 20, the machine tool table 14 may be universally utilized in connection with a plurality of different workpiece fixtures 12. The bottom sections 22 of the dowel pins 20 will all have customized dimensions to match those of the particular machine tool table T-slots 16, but all upper sections 24 of all the dowel pins 20 will have the same dimension whereby a plurality of machine tool tables 14 will individually universally mate with a plurality of different workpiece fixtures 12 (all reference numerals a numerals used above relates to the reference numerals of U.S. Pat. No. 4,553,334).

Thus, U.S. Pat. No. 4,553,334 discloses a dowel pin having an elongated body divided in a first part and a second part. The first part is cylindrical with a circumferential surface. The second part is square-shaped. The second square-shaped part has a cylindrical pin section integrally formed therewith. The cylindrical pin section is received in a counterbore in the cylindrical part, and thus the first part can move relative to the second part in a longitudinal direction of the dowel pin, but not in a transverse direction.

EP1548297A1 discloses a dowel pin for being received in a hole for at least one of connecting and guiding tool, fixture, or machine components comprising a cylindrical circumferential surface, a first longitudinal end, and a second longitudinal end, the circumferential surface comprising a first plurality of primary radially lifted contact areas substantially evenly distributed around the circumference of the cylindrical pin at a first distance D1 from the first longitudinal end and at a second distance D2 from the second longitudinal end, the first distance D1 being smaller than the second distance D2.

SUMMARY

It is an object to provide a dowel pin that will overcome or at least reduce the problem described above.

The foregoing and other objects are achieved by the features of the independent claims. Further implementation forms are apparent from the dependent claims, the description, and the figures.

According to a first aspect, there is provided a dowel pin for use in a pair of dowel pins for positioning a component on a substrate, said dowel pin comprising an elongated substantially cylindrical body with a circumferential surface, said substantially cylindrical body being divided into a first part and a second part with said circumferential surface (5) being divided into a first portion on said first part and a second portion on said second part said first part being movably connected to said second part allowing only relative transverse movement between said first part and said second part.

The inventor arrived at the insight that a substantial portion of the problems relating to assembly are caused by the fixed distance between the pair of dowel pins and the fixed distance between the holes in the component.

Inventor arrived at the further insight that it would be possible to the problem of the fixed distance without offering accuracy by introducing a form of transverse flexibility for one of the dowel pins without offering accuracy, in particular flexibility in the direction towards the other pin in the pair. This flexibility in a direction towards the other pin provides a degree of freedom that avoids or at least reduces overconstraint caused by the fixed distance between the two dowel pins.

Thus, in a pair of dowel pins, the conventional dowel pin will remove two translational degrees of freedom, whilst the flexible dowel pin according to the first aspect removes the final rotation degree of freedom.

Two dowel pins are needed to lock two transitional movements and one rotational movement: one flexible dowel pin according to the first test with one degree of freedom and one conventional flex pin with zero degrees of freedom.

Thus, by providing a dowel pin in which one longitudinal part can move transversely relative to the other longitudinal part of falling advantages are obtained:
higher precision
higher accuracy
easier mounting
lower manufacturing demands for hole location in mating parts
lower manufacturing demand for hole roundness
lower manufacturing demands for hole coaxiality.

In a possible implementation form of the first aspect, the traverse movement is limited in extent by a mechanical stop. Thus, overload protection is provided.

In a possible implementation form of the first aspect the first portion and said second portion making up the complete circumferential surface.

In a possible implementation form of the first aspect, the transverse movement away from a position wherein the first part and the second part are aligned is against the bias of a resilient element. Thus, it is ensured that the first part of the second part are aligned when there is no load on the dowel pin.

In a possible implementation form of the first aspect the first part is movably connected to the second part allowing relative movement between the first part and the second part only in one predetermined transverse direction A. Thus, a flexible dowel pin is provided that is only 1 degree of freedom.

In a possible implementation form of the first aspect, the relative movement is limited to movement in one transverse direction by interacting guide surfaces on the first part and the second part.

In a possible implementation form of the first aspect, the relative movement between the first part and the second part is resiliently biased, preferably resiliently biased to a position where the first part and the second part are aligned.

In a possible implementation form of the first aspect the first portion of the longitudinal extent of the outer surface and the second portion of the longitudinal extent of the outer surface of the substantially cylindrical body together substantially form the complete longitudinal extent of the dowel pin.

In a possible implementation form of the first aspect, the first portion is flush with the second portion when the first part and the second part are aligned. Thus, it is ensured that the dowel pin has a substantially completely flush cylindrical circumferential outer surface when the first part and the second part are aligned and can be used like any conventional dowel pin.

In a possible implementation form of the first aspect, the shape and size of the outer surface of the dowel pin are, at least when the first part and the second part are aligned, in accordance with the requirements for the shape and size required for the outer surface by DIN and/or ISO standards for dowel pins, preferably in accordance with DIN 6325 and/or ISO 2338.

In a possible implementation form of the first aspect, the first part has a hollow interior opening towards the second part, and the second part (3) comprises a connecting member that projects into the hollow interior. Thus, a robust connection is established between the first part and second part.

In a possible implementation form of the first aspect, the connecting member is concentric with the cylindrical body and wherein the connecting member has a cross-sectional area that is smaller than the cross-sectional area of the hollow interior.

In a possible implementation form of the first aspect, a free end of the connecting member is secured to a closed end of the hollow interior.

In a possible implementation form of the first aspect, the connecting member biases the second part resiliently towards a position where the second part is aligned with the first part.

In a possible implementation form of the first aspect, the dowel pin comprises at least a first guide element associated with the first part that interacts with at least a second guide element associated with the second part to allow movement of the second part relative to the first part in one transverse direction and to prevent movement of the second part relative to the first part in all other transverse directions.

In a possible implementation form of the first aspect, the first guide element comprises two parallel and transversely extending primary guide surfaces, the primary guide surfaces preferably being arranged diametrically opposite relative to a longitudinal axis of the dowel pin.

In a possible implementation form of the first aspect, the second guide element comprises two secondary guide surfaces, the secondary guide surfaces preferably being arranged diametrically opposite relative to a longitudinal axis of the dowel pin.

In a possible implementation form of the first aspect the primary guide surfaces are formed by the cross-sectional outline of the hollow interior, preferably the cross-sectional outline of the hollow interior at or near the open-ended end of the hollow interior.

In a possible implementation form of the first aspect, the cross-sectional outline of the hollow interior at or near the open-ended end of the hollow interior is oblong.

In a possible implementation form of the first aspect the cross-sectional outline of the connecting member at or near the longitudinal end of the connecting member closest to the second part is oblong.

In a possible implementation form of the first aspect, the relative movement in the one predetermined transverse direction is limited by a mechanical stop. This ensures the presence of overload protection.

In a possible implementation form of the first aspect, the mechanical stop is provided by the cross-sectional outline of the hollow interior at or near the second member limiting the relative movement of the cross-sectional outline of the connecting member.

In a possible implementation form of the first aspect, the cross-sectional outline of a portion of second member that projects into the hollow interior is configured to fit into the cross-sectional outline of the hollow interior at or near the open-ended end of the hollow interior to allow for the relative movement in the one transverse direction and to prevent relative movement in any other transverse direction.

In a possible implementation form of the first aspect the first part is configured to be at least partially received in a matching bore in the substrate and wherein the second part is configured to be at least partially received in a matching bore in the object.

According to a second aspect, there is provided a pair of dowel pins, the pair comprising one dowel pin according to the first aspect or any possible implementations thereof, and one conventional dowel pin, the conventional dowel pin preferably being a dowel pin in accordance with iso 287 DIN 2768.

According to a third aspect, there is provided a dowel pin for being received in a hole for at least one of connecting and guiding tool, fixture, or machine components, the dowel pin comprising a cylindrical circumferential surface, a first longitudinal end, and a second longitudinal end, the circumferential surface comprising a first plurality of primary radially lifted contact areas substantially evenly distributed around the circumference of the cylindrical pin at a first distance D1 from the first longitudinal end and a second distance D2 from the second longitudinal end, the first distance D1 being smaller than the second distance D2, and a second plurality of secondary lifted contact areas substantially evenly distributed around the circumference of the cylindrical pin at a third distance D3 from the first longitudinal end and a fourth distance D4 from the second longitudinal end, the third distance D3 being larger than the fourth distance D4.

The inventor arrived at the insight that a substantial portion of the problems relating to assembly are caused by the hole in which the dowel pin is to be received is not perfectly circular, and thus not suitable for receiving a perfectly circular dowel pin.

Inventor arrived at the further insight that it would be possible to the problem of the noncircular holes without offering accuracy by the diameter of the major portion of the circumferential surface of the dowel pin and by adding elevated contact surfaces to this reduced diameter circumferential surface. The reduced diameter circumferential service provides for the clearance with innermost parts (apex) of the noncircular hole whilst the elevated contact areas engage the inner side of the hall and provide an effective diameter that corresponds to the norm diameter of the dowel pin.

In a possible implementation form of the third aspect, the first distance D1 is determined from the middle of the primary radially lifted contact areas in the axial direction.

In a possible implementation form of the third aspect, the second distance D2 is determined from the middle of the primary radially lifted contact areas in the axial direction.

In a possible implementation form of the third aspect, the third distance D3 is determined from the middle of the secondary radially lifted contact areas in the axial direction.

In a possible implementation form of the third aspect, the fourth distance D4 is determined from the middle of the secondary radially lifted contact areas in the axial direction.

In a possible implementation form of the third aspect, the second plurality of secondary lifted surfaces is radially lifted to the same extent as the first plurality of primary lifted surfaces.

In a possible implementation form of the third aspect, the radially lifted contact areas have a substantially rectangular outline.

In a possible implementation form of the third aspect, the transition between the radially lifted contact areas and the remainder of the substantially cylindrical circumferential surface is a smooth transition, the transition preferably comprising a chamfer.

In a possible implementation form of the third aspect a free-running distance D1 proportional to the diameter of the cylindrical pin.

In a possible implementation form of the third aspect, the primary radially lifted contact areas and the secondary radially lifted contact areas are radially slightly lifted above the substantially cylindrical circumferential surface of the dowel pin surrounding the primary radially lifted contact areas and the secondary radially lifted contact areas.

In a possible implementation form of the third aspect, the primary radially lifted contact surfaces and the secondary radially lifted contact surfaces are lifted to an extent that ensures that deviation of the hole from nominal geometry does not cause contact with the circumferential surface that is not formed by the primary radially lifted contact surfaces and the secondary radially lifted contact surfaces.

In a possible implementation form of the third aspect, the portion of the substantially cylindrical circumferential surface formed by the primary radially lifted contact areas and by the secondary radially lifted contact areas is compatible with DIN 6325 and/or ISO 2339.

In a possible implementation form of the third aspect, the outer surface of the cylindrical pin neither formed by the primary radially lifted contact areas nor by the second radially lifted contact areas is radially slightly receded relative to the primary radially lifted contact areas and the secondary radially lifted contact areas, and preferably also slightly receded relative to the outer diameter required to be compatible with DIN 6325 and/or ISO 2339.

In a possible implementation form of the third aspect, the first longitudinal end and/or the second longitudinal end comprise a longitudinally tapered portion.

In a possible implementation form of the third aspect, the radially outward surface of the primary radially lifted contact areas and of the secondary radially lifted contact areas is straight in the direction of the axis of the dowel pin and is curved in a circumferential direction.

In a possible implementation form of the third aspect, radially lifted contact areas and of the secondary radially lifted contact areas are curved with a radius extending from the axis of the cylindrical pin to the radially outward surface.

In a possible implementation form of the third aspect, the primary and secondary lifted surfaces form the contact surfaces with a matching hole in which dowel pin is to be inserted.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIG. 1 exploded elevated view of a dowel pin according to an embodiment,

FIG. 2 is a top view of the dowel pin of FIG. 1,

FIG. 3 is a cross-sectional view of the dowel pin of FIG. 4 in a plane coinciding with the longitudinal axis of the dial pin, FIG. 4 is a cross-sectional view of the dowel pin of FIG. 1 in a plane that is traverse at a right angle to the longitudinal axis of the dial pin, FIGS. 5 and 6 are enlarged details of FIG. 4

FIG. 7 is a side view of the dowel pin of FIG. 1,

FIGS. 8 to 10 are cross-sectional views through the dowel pin as shown in FIG. 7

FIG. 11 is a cross-sectional view of the dowel pin as shown in FIG. 7 in a plane coinciding with the longitudinal axis of the dial pin, FIGS. 12 and 13 are enlarged details of FIG. 11, FIG. 14 is an elevated view of the dowel pin of FIG. 1 in gray scale format, FIG. 15 exploded elevated view of a dowel pin according to another embodiment, FIG. 16 is a side view of the dowel pin of FIG. 15

DETAILED DESCRIPTION

Figure 17:
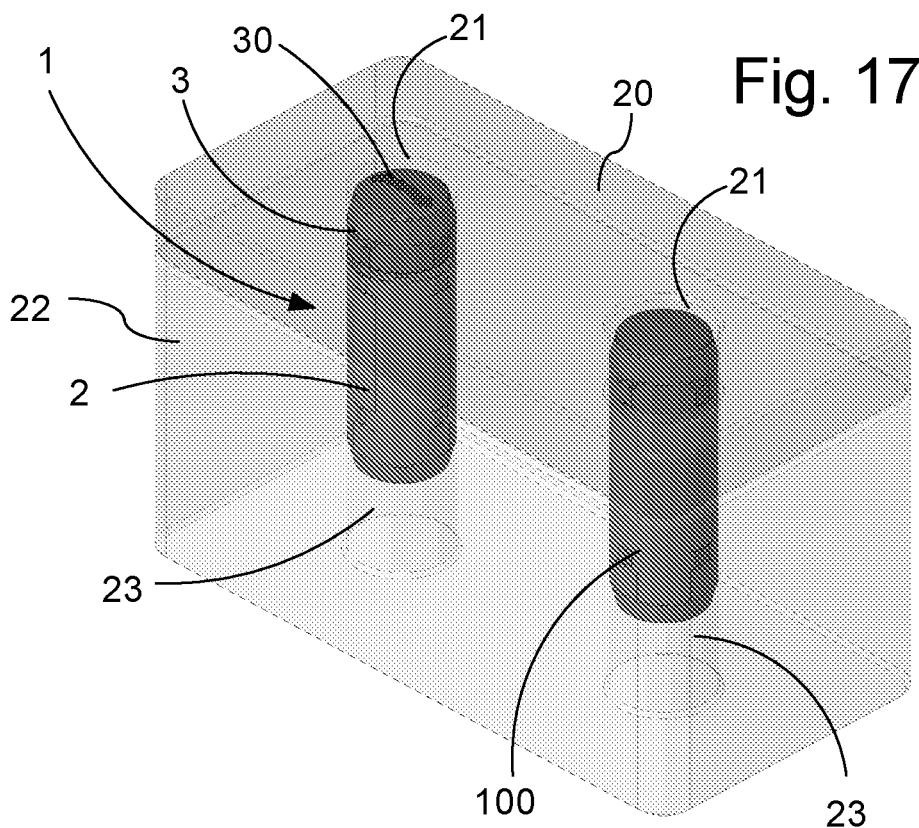
FIG. 17 is an elevated view of a component positioned and secured to a substrate by a dowel pin according to an embodiment and a conventional dowel pin.

Referring to FIGS. 1,2 and 3 a dowel pin 1 (also called parallel pin or guide pin) is shown with a cylindrical body 4 that is formed by a first part 2 connected to a second part 3. The cylindrical body 4 is divided into the first part 2 and the second part 3.

The dowel pin 1 is intended to be used in a way identical or at least similar to the way that conventional dowel pins are used. Overall, the circumferential surface 5 of the cylindrical body 4 is manufactured to comply with the standards for dowel pins, such as e.g. DIN 6325 or ISO 2338.

The first part 2 forms a first portion 6a of the (cylindrical) circumferential surface 5 of the dowel pin 1. The second part forms a second portion 6B of the (cylindrical) circumferential surface five the dowel pin 1. In an embodiment, the first portion 6A and the second portion 6B together form the complete circumferential surface of the dowel pin 1.

The second part 3 is connected to the first part 2 in a way that allows relative movement of the second part 3 relative to the first part 2 in transverse directions, i.e. in directions perpendicular to the longitudinal extent of the dowel pin 1. The extent of the transverse movement is mechanically limited and, in an embodiment, resiliently biased towards the center position in which the first portion 6A and the second portion 6B are completely aligned, preferably aligned to form one substantially flush circumferential surface 5 of the dowel pin 1. It is however understood that it is perfectly acceptable to have a gap between the first portion 6A and the second portion 6B.

In the shown embodiment, the diameter of first portion 6A is the same as the diameter of the second portion 6B, but it is understood that the first portion 6A and the second portion 6B can have different diameters, with for example the second portion 6A having a smaller or a larger diameter than the first portion 6B.

In the present embodiment, the second part 3 is connected to the first part 2 by a connecting member 8. In the present embodiment, the connecting member 8 is formed by a rod that is an integral part of the second part 3. It is however understood that the connecting member 8 does not have to be integral with the second part 3 and could be connected at its proximal end to the second part 3.

The first member 2 is provided with a hollow interior 7 that opens to longitudinal the end of the first member 2 that faces the second member 3.

The connecting member 8 extends into the hollow interior 7 of the first member 2. The distal end of the connecting member 8 is rigidly secured to the first member 2 at or near the first longitudinal end 27 of the first member 2 opposite to the longitudinal end to which the hollow interior 7 opens. Hereto, the distal end of the connecting member 8 is in an embodiment provided with, or connected to, a cylindrical base 28 that is secured in a matching cylindrical bore in the first member 2. The cylindrical base 28 is an embodiment provided with a flange 29 to ensure that the cylindrical base 28 is inserted into the bore to the correct depth.

Figure 21:
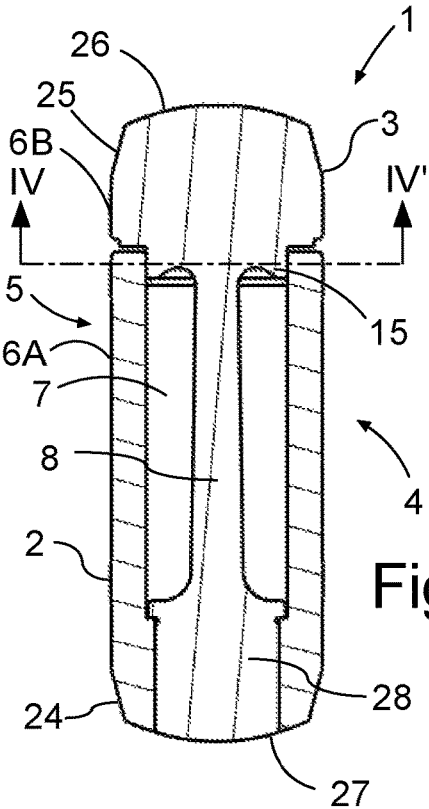
FIG. 21 is a sectional view of another embodiment of the dowel pin.

In an embodiment shown in FIG. 21, the bore in which the cylindrical base 28 is received opens to the longitudinal end of 27 the first member 2 and the tip of the cylindrical base 28 forms the end surface of the first member 2.

In an embodiment the first longitudinal end 27 is provided with a convex surface, preferably a convex surface that is compatible with standards for dowel pins, such as e.g. the above-referenced standards.

In embodiments the second longitudinal end 26 of the second part 2 is provided with a convex surface, preferably a convex surface that is compatible with the standards for dowel pins, such as e.g. the above-referenced standards.

The connection member 8 is arranged such that the second member has its circumferential surface 6B aligned with the circumferential surface 6A of the first member 2 when there is no transverse load on urging the second member 3 transversely to the first member 2.

The relatively slim connecting member 8 allows for transverse movement of the second member 3 relative to the first member 2 when a transverse load or force is applied to the second member 3. The extent of this transverse movement is restricted by a mechanical stop.

The mechanical stop is formed by mechanical interaction between one or more guide surfaces associated with the second part 3 and one or more guide surfaces associated with the first part 2. In the present embodiment, as illustrated in FIGS. 4, 5 and 6, the surface associated with the second part 3 is formed by a disk-shaped number 15 connected to or integral with the second member 3, which is received in the opening of the hollow interior 7. The inner surface of the opening forms the guide surface associated with the first member 2 and the circumferential surface 16 of the disc-shaped number 15 forms the guide surface associated with the second part 3.

In the present embodiment, the inner surface of the opening comprises two planar guide surfaces 12, 13. The guide services 12, 13 are diametrically spaced apart at a distance that corresponds exactly to the diameter of the disc-shaped member 15. Thus, due to the contact between the circumferential contact surface 15 with the planar contact surfaces 12, 13, in this embodiment the second part 3 is guided in one linear transverse direction and can only move in one transverse direction relative to the first part 2 (one direction of freedom). The one transverse direction is illustrated by the arrows A and A' in FIG. 2

The extent movement in the one transverse direction is limited (overload protection) by the gap 18 (clearance) between the circumferential surface 16 and the inner surface of the opening of the hollow interior 7. Thus, the opening is in this embodiment an oblong shape that allows only transverse relative movement of the second part 3 relative to the first part 2. In an embodiment (not shown) the disc-shaped member is provided with diametrically opposite planar guide surfaces that interact with the planar guide surfaces 12, 13 of the opening in order to avoid line contact and thereby obtain lower contact pressures.

The arrangement for ensuring that the second part 3 moves only in one transverse direction relative to the first part 2 may comprise other types of guide surfaces, such as e.g. rods, bars grooves or bores or combinations thereof.

In an embodiment, the dowel pin 1 is configured such that it allows a substantially equal extent of movement in all transverse directions (two directions of freedom) e.g. by having a circular shape for the opening with a disk-shaped member 15 received therein with a slightly smaller diameter than the opening.

The disc-shaped number 15 is in the present embodiment integral with the second part 3, but it is understood that that disk-shaped number 15 could be connected to the second part 3 by various connection means such as e.g. bolting, adhesive or welding.

In the present embodiment, the second longitudinal end 26 of the second part 3 is provided with an arrow and 30 indicating the direction in which transverse movement of the second part 3 relative to the first part 2 is possible. This arrow 30 provides visual help for manual or robot installation of the dowel pin 1 with the correct mechanical orientation when mounting the dowel pin 1 in a hole in e.g. a substrate. The hero can be provided by engraving, by milling, by printing or by other suitable means.

In an embodiment, the first part 2 is provided with tapering section 24 (conical frustum) towards the first longitudinal end 27 and the second part 2 is provided with a tapering section 25 (conical frustum) towards the second longitudinal and 26, in order to facilitate inserting the dowel pin 1 in a hole.

As shown in FIGS. 8 to 10, the connection member 8 in the present embodiment is relatively thin in order to allow the collection member 8 to flex (elastically bend) and thereby to allow relative transverse movement of the second part 3 relative to the first part 2.

FIGS. 11 to 13 illustrate another aspect of the valve pin 1 according to the present embodiment, namely a number of radially lifted surfaces 31, 33, 35. FIG. 11 is a sectional view along the length of the dowel pin 1, and FIGS. 12 and 13 are two enlarged sections of FIG. 11 illustrating details of the radially lifted contact areas.

A first plurality of primary radially lifted contact areas 33 is circumferential substantially evenly distributed around the circumference of the cylindrical pin 1 on the first part 2 at a first axial distance D1 from the first longitudinal end and at an axial second distance D2 from the second longitudinal end of the first part 2. The axial first distance D1 is smaller than the second axial distance D2.

The first distance D1 is determined from the middle of the primary radially lifted contact areas 33 in the axial direction, the second distance D2 is determined from the middle of the primary radially lifted contact areas 33 in the axial direction.

A second plurality of secondary radially lifted contact areas 35 is circumferential substantially evenly distributed around the circumference of the dowel pin 1 on the first member 2 at a third axial distance D3 from said first longitudinal end and a fourth axial distance D4 from the second longitudinal end, the third distance D3 being larger than the fourth distance D4.

The third distance D3 is determined from the middle of the secondary radially lifted contact areas 35 in the axial direction and the fourth distance D4 is determined from the middle of the secondary radially lifted contact areas 35 in the axial direction.

The second plurality of secondary lifted surfaces 35 is radially lifted to the same extent as the first plurality of primary radially lifted surfaces 33.

A third plurality of tertiary radially lifted contact areas 31 is substantially circumferentially evenly distributed around the circumferential surface of the dowel pin 1 on the second member 3 at a fifth axial distance D5 from the second longitudinal end of the dowel pin 1.

In an embodiment, the third plurality of tertiary lifted surfaces 31 is radially lifted to the same extent as the first plurality of primary radially lifted surfaces 33.

In the present embodiment, the radially lifted contact areas 31,33,35 have a substantially rectangular outline. However, it is understood that the radially lifted contact areas 31, 33, 35 can have any other suitable outline, such as e.g. a circular, oval, triangular, or polygon outline.

The transition between the radially lifted contact areas 31,33,35 and the remainder of the substantially cylindrical circumferential surface of the pin 1 in an embodiment a smooth transition. In an embodiment, this transition is a curved transition or is a transition that comprises a chamfer. However, it is noted any type of smooth transition between the cylindrical circumferential surface of the dowel pin 1 and the radially lifted contact areas 31, 33, 35 can be used.

Preferably, the plurality of primary radially lifted contact areas 33 comprises four primary contact areas that are circumferentially evenly distributed around the first part 2. However, it is understood that it is also possible to use three or more than four primary radially lifted contact areas 31. The same number of secondary and tertiary radially lifted contact areas 35,31 is used.

The primary radially lifted contact areas 33 are in an embodiment rotationally aligned with the secondary radially lifted contact areas 35 and in an embodiment, the tertiary radially lifted contact areas 31 are rotationally aligned with the primary radially lifted contact areas 33.

The plurality of primary radially lifted contact areas 33 is arranged at an axial distance D1 from the first longitudinal end 27 of the dowel pin 1 formed by the first part 2, such that there is a "free-running" (clearance fit) distance DC, the length of which is proportional to the diameter of the dowel pin 1.

Normally, the dowel pin 1 is inserted with its first part 2 into a designated hole before the second part 3 is inserted into another designated hole of another object.

The free-running extent of the length of the first part 2 secures that an operator can correctly rotationally align the dowel pin 1 with its one direction of radial movement in the direction of arrow 30 before the radially lifted contact areas are loaded and rendered rotation of the dowel pin 1 difficult or impossible. This secures correct mounting with no risk of scratching the sides, thereby maximizing precision and reducing mounting force variation.

The free-running (clearance fit) distance DC is N times the diameter of the dowel pin 1.

The primary radially lifted contact areas 33 and the secondary radially lifted contact areas 35, 36 are radially slightly lifted above the substantially cylindrical surface 5 of the cylindrical pin 1 surrounding the primary radially lifted contact areas 33 the secondary radially lifted contact areas 35 and the tertiary radially lifted contact areas 31.

The circumferential surface 5 of the cylindrical pin 1 not formed by radially lifted contact areas is radially slightly receded relative to the radially lifted contact areas 31, 33, 35.

With the radially lifted surfaces 31,33,35 forming the contact surface compatible with the various standards, e.g. DIN 6325 and/or ISO 2339, the circumferential surface 5 of the cylindrical pin 1 not formed by radially lifted contact areas 31,33,35 is radially slightly receded relative outer diameter required to be compatible with various standards, e.g. DIN 6325 and/or ISO 2339.

The radially lifted contact areas 31, 33, 35 are radially lifted by relative to the remainder of the circumferential surface of the dowel pin 1 by an amount sufficient to ensure that any deviation of the hole in which the dowel pin 1 is to be inserted from nominal geometry does not cause contact between the hole wall and the remainder of the circumferential surface 5 of the dowel pin 1. The allowed deviation from nominal geometry of a hole for receiving a dowel pin 1 is defined by standards for tolerances such as e.g. ISO 287 or DIN 2768. In an embodiment, the minimum amount of lift for the radially lifted contact areas 31, 33, 35 in order to avoid contact of the remaining circumferential surface of the dowel pin 1 with the hole wall is increased by a security margin or even multiplied by a factor to ensure that no contact will take place between the remaining circumferential surface of the dowel pin 1 and the hole wall.

The radially lifted contact surfaces 31, 33, 35 form the contact surfaces with a matching hole in which the dowel pin 1 is to be inserted.

Thus, the contact surface is formed by the radially lifted contact areas 31, 33, 35 that are compatible with DIN 6325 and/or ISO 2339, i.e. the radially lifted contact areas 31, 33, 35 form contact surfaces that are in the same position as the cylindrical circumferential surface 5 of a conventional dowel pin 100 with the same diameter, whilst the receded area of the circumferential surface 5 of the dowel pin 1 is receded compared to a conventional dowel pin 100 with the same diameter.

In an embodiment, the first longitudinal end 27 of the dowel pin 1 on the first part 2 and the second longitudinal end 26 of the dowel pin 1 on the second part 3 comprises a longitudinally tapered portion, preferably in a fashion that forms a surface corresponding to a conical frustum.

In an embodiment surface of the primary, secondary and tertiary radially lifted contact areas 31, 33, 35 is straight in the direction of the axis of the dowel pin 1 and is curved in a circumferential direction relative to the axis of the dowel pin 1.

The primary, secondary and tertiary radially lifted contact areas 33, 35, 31 are curved with a radius that matches the radius of a conventional dowel pin 100 with the same intended diameter.

FIG. 14 is an elevated grayscale view that illustrates a dowel pin 1 according to the above embodiment with its lifted surfaces 31, 33, 35.

FIGS. 15 and 16 illustrate another embodiment of the dowel pin 1. In this embodiment, structures and features that are the same or similar to corresponding structures and features previously described or shown herein are denoted by the same reference numeral as previously used for simplicity. The dowel pin 1 of FIGS. 15 and 16 is essentially identical to the dowel pin 1 described with reference to FIGS. 1 to 14, except that the dowel pin 1 has a circumferential surface that is not provided with any lifted surfaces, and generally corresponds to the shape of a circular cylinder.

Figure 18:
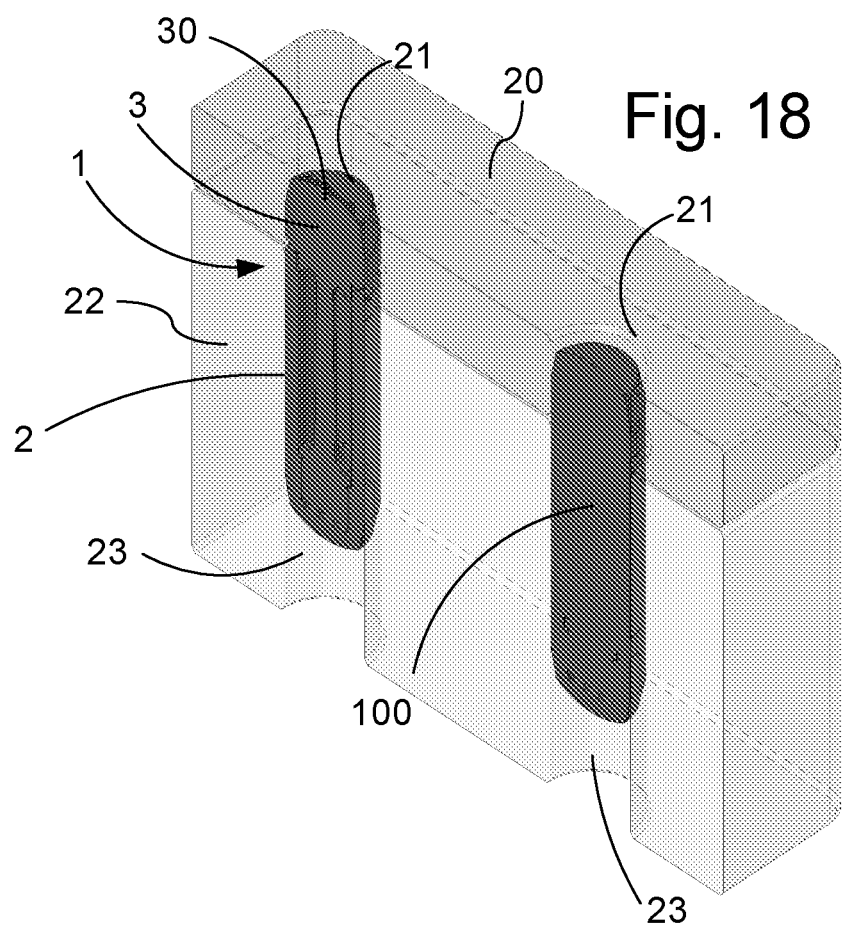
FIG. 18 is a cutaway version of FIG. 17, FIG. 19 a top view on the component positioned and secured to a substrate by a dowel pin according to an embodiment and a conventional dowel pin as shown in FIG. 17.
Figure 19:
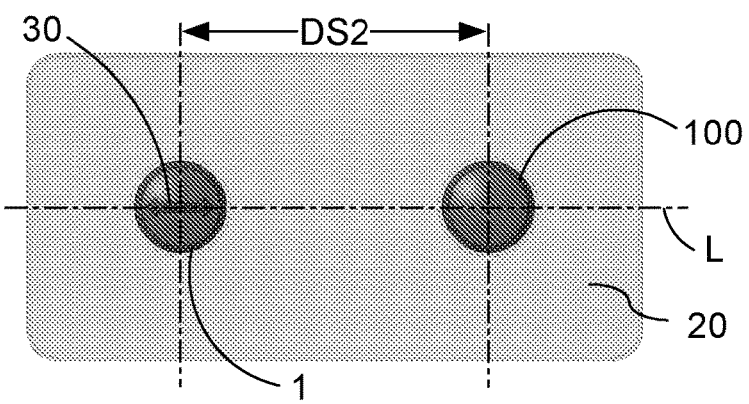

FIGS. 17 to 19 illustrates the use of the valve pin 1 according to the various embodiments in combination with a conventional dowel pin 100 to form a pair of dowel pins.

A substrate 22, such as e.g. a base or carrier of a machine is provided with a first and third precisely machined hole 23.

A dowel pin 1 according to an embodiment is shown with its first part 2 inserted into the first bore (hole) 23 in the substrate 22 and with its second part 3 inserted into a second hole 21 of a component 20. Another dowel pin 100 of a conventional type is inserted with one end into a third bore 23 in the substrate 22 and with another end into a fourth bore 21 of the component 20.

The substrate 22, such as e.g. a base for carrier of a machine is provided with the first and second precisely machined bores 23 spaced apart by a distance DS1 between their respective centers, as measured along a center line L that runs through the respective centers of the first bore 23 and the third bore 23.

In the shown embodiment, the diameter of the first bore 23 and the third bore 23 are identical, but it is understood that the diameter is of these two bores can be different from one another.

The component 20, such as e.g. an object or blank that needs to be machined by the machine of the substrate 22 is also provided with a first and second precisely machined bore 21 that are spaced apart by a distance DS2, which should be exactly the same as the distance DS1.

However, there will always be a certain deviation in the distance between the two holes. This deviation is caused by the tolerances inherent to the production processes and assembly, as well as the deviations that occur during use caused by thermal expansion, movement, and load on the parts. In conventional dowel pins, these deviations will cause uncontrollable displacements between parts and uncontrollable inner forces in the parts. Both the inner forces and the displacements have a negative influence on the main task of the dowel pin of locating one part very accurately relative to another part. Thus, it impossible to machine two holes at a desired distance absolute precision and therefore, in this context, exact is as exact as in accordance with required standards or as is economically feasible. Accordingly, in practice, there will always be a slight deviation between distance DS1 and distance DS2. This deviation in distance will create problems when mounting the component 20 on the substrate since the distance between the dowel pin 1 and the conventional dial pin 100 as defined by the distance D1 (assuming that the dowel pin 1 and the conventional dowel pin 100 are inserted in the substrate 22 before the component 20 is mounted on the substrate) will always be slightly different from the distance DS2 between the second hole 21 and the fourth hole 21. This slight difference in distance is likely to cause significant resistance to the component 20 being placed over the dowel pin 1 in the conventional dial pin 100 if there is an accurate or tight fit between the dowel pin 1, the conventional dial pin 100 and the holes 21,23 in which they are received since the resulting system will be very rigid and thus even a minor deviation between the distance DS1 and DS2 leads to the component 20 requiring significant force to be installed on the dowel pin 1 and the conventional dial pin 100 and equally requiring significant force for the component 20 to be removed after machining or other operation if it was not for the fact that the second part 3 is radially movable in the direction of the centerline L.

The movability of the second part 3 relative to the first part 2 of the dowel pin 1 in the direction along the centerline L allows for compensation of the slight deviation between the distances DS1 and DS2, thereby allowing easy and smooth mounting (and subsequent removal) of the component 20 on the substrate 22 using accurate fit between the dial pin 1, conventional dial pin 100 and the holes 21, 23 in which they are received.

The conventional dial pin 100 and the dowel pin 1 according to an embodiment together form a pair of dowel pins that accurately position the component 20 relative to the substrate 23, whilst simultaneously ensuring easy mounting and subsequent removal of the component 20.

The conventional pin 100 removes two translational degrees of freedom, while the dowel pin 1 removes the final rotational degree of freedom. Hereto, the dowel pin 1 needs to be inserted into the hole 23 with the correct rotational orientation, such that the only one direction of transverse movement as indicated by arrow 30 is parallel with a centerline L connecting the center of the first hole 23 with second hole 23. Thus, movement of the second part 3 of the dowel pin 1 in the direction of the centerline compensates for any deviance between the distance DS1 and the distance DS2, while simultaneously ensuring that the component 20 is as accurately position relative to the substrate 23 as when using two conventional dowel pins 100 with an accurate or tight fit.

Figure 20:
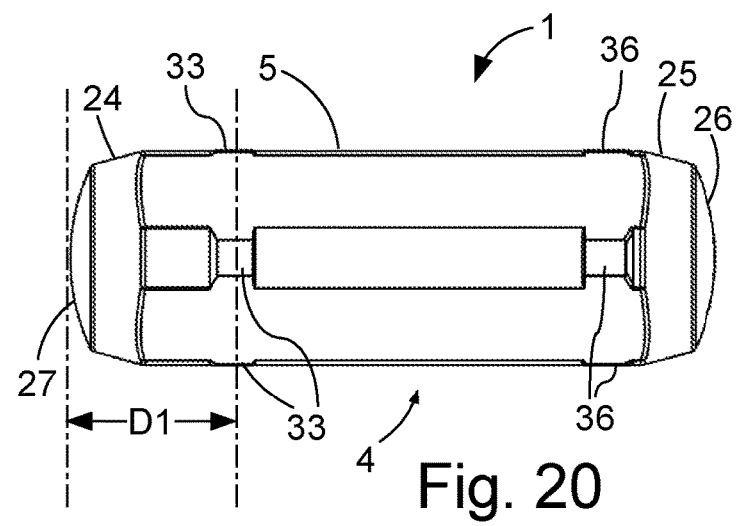
FIG. 20 is side view a dowel pin according to another embodiment.

FIG. 20 discloses another embodiment that is similar to the previously described embodiments, except that the dowel pin 1 is a single-piece construction. In this embodiment, structures and features that are the same or similar to corresponding structures and features previously described or shown herein are denoted by the same reference numeral as previously used for simplicity.

The term cylinder and cylindrical in this disclose refer in embodiments to a circular cylinder. However, it is understood that it is possible to construct a dowel pin 1 with transverse movability of the second part relative to the first part with the local dowel been having a cylindrical circumferential surface that is different from a circular cylinder and instead is formed by other types of cylindrical surfaces, such as e.g. elliptic cylinders.

The dowel pin 1 according to the embodiments above can be made from any suitable material, such as metals, ceramics, composites and/or plastics.

The dowel pin 1 according to the embodiments can be manufactured by machining, forming, grinding and/or additive manufacturing. The dowel pins 1 and effected accordingly can be surface treated by conductive surface treatment, hardening, polishing, corrosion protection and/or friction decreasing.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality.

The reference signs used in the claims shall not be construed as limiting the scope.

The invention claimed is:

1. A dowel pin (1) for use in a pair of dowel pins for positioning a component (20) on a substrate (22), said dowel pin (1) comprising an elongated substantially cylindrical body (4) with a circumferential surface (5), said substantially cylindrical body (4) being divided into a first part (2) and a second part (3) with said circumferential surface (5) being divided into a first portion (6a) on said first part (2) and a second portion (6b) on said second part (3) said first part (2) being movably connected to said second part (3) allowing only relative transverse movement between said first part (2) and said second part (3).

2. A dowel pin (1) according to claim 1, wherein said transverse movement away from a position wherein said first part (2) and said second part (3) are aligned is against the bias of a resilient element.

3. A dowel pin (1) according to claim 1, wherein said relative movement is limited to relative movement in one transverse direction.

4. A dowel pin (1) according to claim 3, wherein said relative movement is limited to relative movement in one transverse direction by interacting guide surfaces (12,13,16) on said first part (2) and said second part (3).

5. A dowel pin (1) according to claim 1, wherein the first portion (6a) is flush with said second portion (6b) when said first part (2) and said second part (3) are aligned.

6. A dowel pin (1) according to claim 1, wherein said first part (2) has a hollow interior (7) opening towards said second part (3), and wherein said second part (3) comprises a connecting member (8) that projects into said hollow interior (7).

7. A dowel pin (1) according to claim 6, wherein said connecting member (8) is concentric with said cylindrical body (4) and wherein said connecting member (8) has a cross-sectional area that is smaller than the cross-sectional area of said hollow interior (7).

8. A dowel pin (1) according to claim 6, wherein a free end of said connecting member (8) is secured to a closed end (10) of said hollow interior (7).

9. A dowel pin (1) according to claim 6, wherein said connecting member (8) biases said second part (3) resiliently towards a position where said second part (3) is aligned with said first part (2).

10. A dowel pin (1) according to claim 1, comprising at least a first guide element (11) associated with said first part (2) that interacts with at least a second guide element (15) associated with said second part (3) to allow movement of said second part (3) relative to said first part (2) in one transverse direction and to prevent movement of said second part (2) relative to said first part (3) in all other transverse directions.

11. A dowel pin (1) according to claim 10, wherein said first guide element (11) comprises two parallel and transversely extending primary guide surfaces (12,13), said primary guide surfaces (12, 13) preferably being arranged diametrically opposite relative to a longitudinal axis of the dowel pin (1).

12. A dowel pin (1) according to claim 10, wherein said second guide element (15) comprises two secondary guide surfaces (16, 17), said secondary guide surfaces (16, 17) preferably being arranged diametrically opposite relative to a longitudinal axis of the dowel pin (1).

13. A dowel pin (1) according to claim 1, wherein said first part (2) is configured to be at least partially received in a matching bore (23) in said substrate (22) and wherein said second part (3) is configured to be at least partially received in a matching bore (21) in said object (20).

14. A pair of dowel pins, said pair comprising one dowel pin (1) according to claim 1, and one conventional dowel pin (100), said conventional dowel pin preferably being a dowel pin in accordance with iso 287 or DIN 2768.

15. A dowel pin (1) for being received in a hole for at least one of connecting and guiding tool, fixture, or machine components, said dowel pin (1) comprising:
a cylindrical circumferential surface (5),
a first longitudinal end, and
a second longitudinal end, said circumferential surface (5) comprising:

a first plurality of primary radially lifted contact areas (33) substantially evenly distributed around the circumference of said cylindrical pin (1) at a first distance D1 from said first longitudinal end and at a second distance D2 from said second longitudinal end, said first distance D1 being smaller than said second distance D2, characterized by a second plurality of secondary lifted contact areas (35,36) substantially evenly distributed around the circumference of said cylindrical pin (1) at a third distance D3 from said first longitudinal end and at a fourth distance D4 from said second longitudinal end, said third distance D3 being larger than said fourth distance D4.

16. A dowel pin (1) according to claim 15, wherein said second plurality of secondary lifted surfaces (35) is radially lifted to the same extent as the first plurality of primary lifted surfaces (33).

17. A cylindrical pin (1) according to claim 15, wherein the transition between said radially lifted contact areas and the remainder of said substantially cylindrical circumferential surface is a smooth transition, said transition preferably comprising a chamfer.

18. A dowel pin (1) according to claim 15, wherein a free-running distance D1 proportional to the diameter of said cylindrical pin (1).

19. A dowel pin (1) according to claim 15, wherein said primary radially lifted contact areas (33) and said secondary radially lifted contact areas (35, 36) are radially slightly lifted above the substantially cylindrical circumferential surface (5) of said dowel pin (1) surrounding said primary radially lifted contact areas (33) and said secondary radially lifted contact areas (35, 36).

20. A dowel pin (1) according to claim 15, wherein the portion of said substantially cylindrical circumferential surface formed by said primary radially lifted contact areas (33) and by said secondary radially lifted contact areas (35) is compatible with DIN 6325 and/or ISO 2339.

21. A dowel pin (1) according to claim 15, wherein the outer surface of the cylindrical pin (1) neither formed by said primary radially lifted contact areas nor by said second radially lifted contact areas is radially slightly receded relative to said primary radially lifted contact areas and said secondary radially lifted contact areas, and preferably also slightly receded relative to the outer diameter required to be compatible with DIN 6325 and/or ISO 2339.

22. A dowel pin (1) according to claim 15, wherein said first longitudinal end (26) and/or said second longitudinal end 27) comprise a longitudinally tapered portion (24,25).

23. A down pin (1) according to claim 15, wherein the radially outward surface of said primary radially lifted contact areas (33) and of said secondary radially lifted contact areas (35) is straight in the direction of the axis of the dowel pin (1) and is curved in a circumferential direction.

24. A dowel pin (1) according to claim 23, wherein said primary radially lifted contact areas (33) and said secondary radially lifted contact areas (35) are curved with a radius extending from the axis of the cylindrical pin to said radially outward surface.

25. A dowel pin according to claim 15 wherein said primary and secondary lifted surfaces (33, 35) form the contact surfaces with a matching hole in which dowel pin (1) is to be inserted.

* * * * *